United States Patent [19]
Bonn

[11] Patent Number: 5,484,526
[45] Date of Patent: Jan. 16, 1996

[54] MEMBRANE PLATE FOR PLATE FILTER PRESSES

[75] Inventor: Heinz Bonn, Kreuzau-Winden, Germany

[73] Assignee: Eberhard Hoesch & Söhne GmbH, Verfahrens- und Anlagentechnik, Düren, Germany

[21] Appl. No.: 969,214

[22] PCT Filed: Aug. 21, 1991

[86] PCT No.: PCT/EP91/01584

§ 371 Date: Feb. 5, 1993

§ 102(e) Date: Feb. 5, 1993

[87] PCT Pub. No.: WO92/21423

PCT Pub. Date: Dec. 10, 1992

[30] Foreign Application Priority Data

Jun. 6, 1991 [DE] Germany .................................. 4118620

[51] Int. Cl.$^6$ .............................................. B01D 25/168
[52] U.S. Cl. .......................... 210/229; 210/230; 210/231; 100/211
[58] Field of Search .................................. 210/227–229, 210/231, 224, 230; 100/211

[56] References Cited

U.S. PATENT DOCUMENTS

| | | | |
|---|---|---|---|
| 4,608,164 | 8/1986 | Neu | 210/231 |
| 4,749,482 | 7/1988 | Bonn | 210/231 |
| 5,051,179 | 9/1991 | Hermann | 210/228 |

FOREIGN PATENT DOCUMENTS

| | | |
|---|---|---|
| 0357015 | 3/1990 | European Pat. Off. . |
| 3520653 | 12/1986 | Germany . |
| 2157585 | 10/1985 | United Kingdom . |

*Primary Examiner*—Matthew O. Savage
*Attorney, Agent, or Firm*—Spencer, Frank & Schneider

[57] ABSTRACT

A membrane plate for a filter press includes a plate member composed of a plate wall having a peripheral region provided with a plate wall groove and a plate frame surrounding the plate wall. A flexible press membrane is disposed adjacent at least one side of the plate wall and a holding frame covers a membrane edge bead received in the plate wall groove. A connecting arrangement secures the holding frame to the plate frame and permits transverse movement of the holding frame with respect to the plate wall. The connecting arrangement includes a continuous peripheral groove in the plate frame and a continuous, elastic member supported on the holding frame. The elastic member projects from the holding frame and is received by the continuous peripheral groove.

6 Claims, 2 Drawing Sheets

MEMBRANE PLATE FOR PLATE FILTER PRESSES

BACKGROUND OF THE INVENTION

The invention relates to a membrane plate for plate filter presses, the membrane plate including a plate wall having a plate frame around its periphery which, together with the adjacent filter plates, delimits a filter chamber on both sides of the plate. On at least one side of the plate, the membrane plate is provided with a press membrane which can be charged by a pressure medium and is provided with a continuous edge bead that is fixed in a groove in the transition region between the plate frame and the plate wall and is covered on its side facing the adjacent plate by a holding frame that is fastened to the plate edge so as to be movable, within limits, in a direction perpendicular to the plane of the plate. If the filter chamber is open, the holding frame projects beyond the plane defined by the contact surface of the filter frame.

A membrane plate of the above-mentioned type is disclosed in DE-A 3,520,653 to which corresponds U.S. Pat. No. 4,749,482. Since the holding frame of the prior art membrane plate is connected with the plate frame so as to be movable in a direction perpendicular to the plate plane, the edge bead can be held loosely or only with a slight tension in the groove when the chamber is open. The material of the edge bead is thus compressed by way of the movable holding frame only if the filter plate packet is closed. The degree of deformation is here unequivocally determined by the dimension by which the holding frame projects beyond the plane defined by the contact surface of the plate frame. As soon as the chamber is opened again, the material of the edge bead is able to relax again so that, during the relatively long opening times in operation of such a plate filter press, the material of the edge bead is able to recover. Since, moreover, the holding frame also covers part of the adjacent membrane edge, a sufficient seal results for the pressure chamber disposed between the plate wall and the membrane when the filter chamber is closed, thus permitting very high pressure forces to be exerted on the membrane. If the filter chamber is closed, the filter cloth is not pressed onto the membrane material, but only on the much more resistant material of the holding frame so that here again the danger of locally excessive stresses, which may constitute the starting point for cracks, is avoided. The holding frame is fastened to the plate frame by way of resilient snap pins.

SUMMARY OF THE INVENTION

The invention is now based on the task of further improving the prior art membrane plate by improving the connection between the press membrane and the membrane plate and by improving the geometric relationships in the transition region.

This task is accomplished by the invention in that the plate frame, at its edge facing the peripheral surface of the holding frame, is provided with a continuous groove. The holding frame is provided with a peripheral web-like projection of an elastic material which is associated with the groove, engages therein and limits movement of the holding frame in a direction perpendicular to the plane of the plate. This configuration has the advantage, compared to the prior art connection by way of resiliently mounted snap pins, of a considerably simplified manufacturing process since only one continuous groove must be shaped into the plate frame. Since the web-like projection is made of an elastic material, it can easily be pressed into the groove after the holding frame has been placed onto the edge bead so that the holding frame is locked to the plate frame in a form-locking but movable manner. As a preferred feature of the invention it is here provided that at least the holding frame is fixed to the press membrane in the region of the edge bead. In this connection it is further advisable for the web-shaped projection also to be fixed to the holding frame. Since, in consideration of the sealing effect, the press membrane as well as the web-shaped projection must be produced of a relatively soft material compared to the holding frame, particularly of rubber, the holding frame must be glued to the edge of the press membrane and/or to the web-shaped projection or it must be connected by vulcanization if the holding frame itself is made of a rubber material having a higher Shore hardness. Another advantage of the solution according to the invention compared to the prior art is that the web-shaped projection serving as a fastening means for the holding frame can also be produced of a corrosion resistant, non-metallic material so that, aside from the exceptional case of hot filtration, such filter plates can be produced entirely of non-metallic materials, particularly of plastic and/or rubber.

As a suitable feature of the invention it is provided that the peripheral surface of the holding frame is provided with a continuous supporting web for the web-shaped projection. This arrangement has the advantage that, in the installed position, the holding frame is held in a form lock in the plate frame by way of the web-shaped projection so that, whether the web-shaped projection is inserted loosely or it is fixed to the holding frame, the holding frame and thus the press membrane are reliably held when the plate filter press is open. In this connection it is advisable for the web-shaped projection to be provided with a sealing element that lies against the supporting web of the holding frame. In this way, the gap between the plate frame and the holding frame, which is required to move the holding frame, is reliably sealed. This is particularly advantageous if, as a further feature of the invention, the plate frame edge facing the holding frame is provided, between the contact region of the edge bead, on the one hand, and the web-shaped projection, on the other hand, with a channel-shaped recess that extends over at least part of the periphery and is in communication by way of bores with the channel bores provided for the filtrate and the washing liquid and extending within the plate frame and, if transverse bores are provided in the holding frame, for respectively connecting the chamber with the channel-shaped recesses. In this way a sealed channel is provided between the plate frame and the holding frame so as to ensure proper liquid discharge in the edge region of the filter cake. Since for most uses such filter plates are made of plastic, the solution according to the invention has the additional advantage that it is possible to influence the filtrate discharge and thus the cake formation by way of the number and/or position of the existing transverse bores with respect to the channel bores.

DETAILED DESCRIPTION OF THE PREFERRED EMBODIMENT

Figure 1:
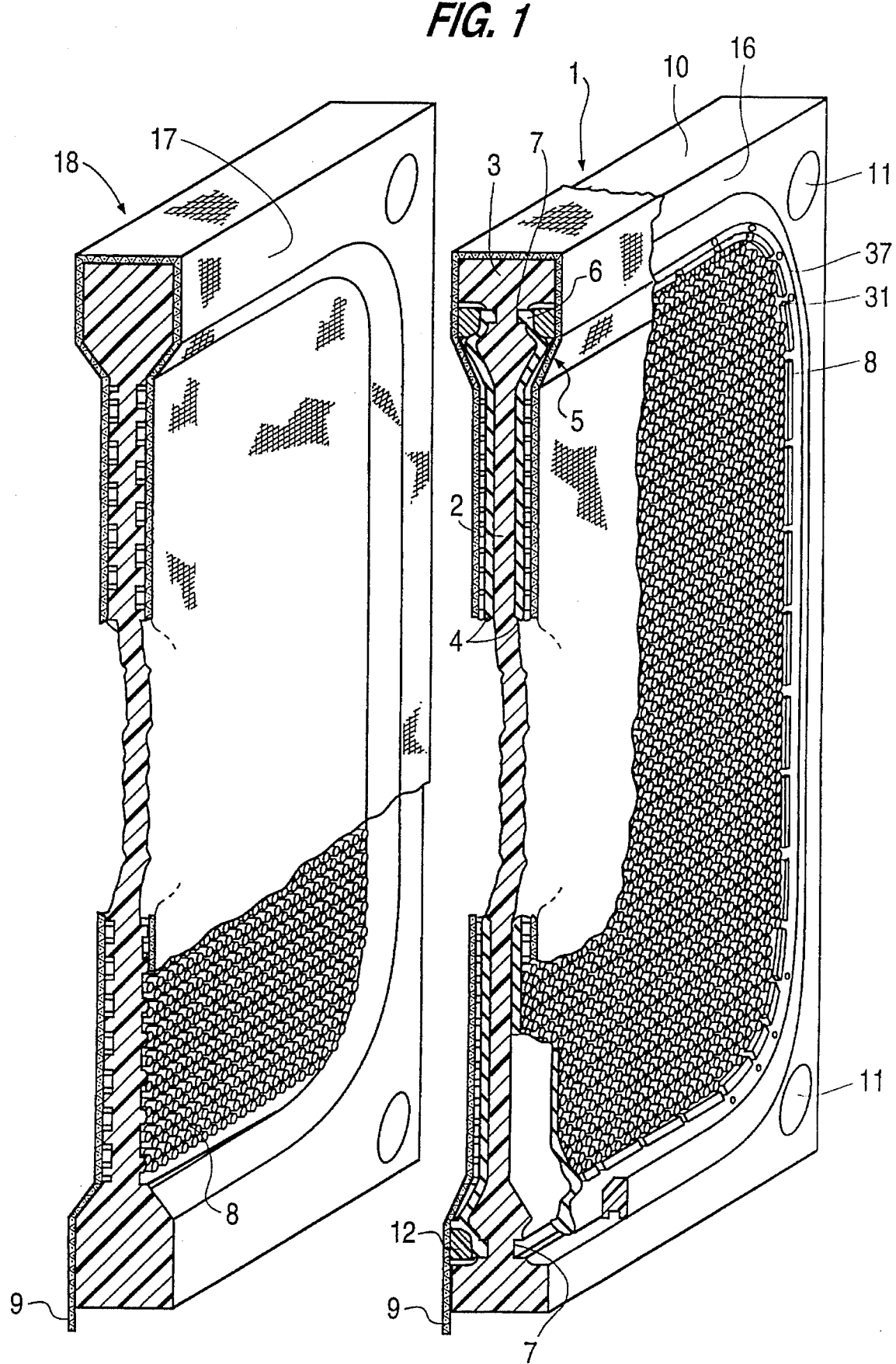
FIG. 1 is a perspective view, partially in section, of a membrane plate equipped with a double membrane, and of an adjacent filter plate.

The membrane plate 1 shown in FIG. 1 for a plate filter press equipped with vertically oriented filter plates includes a plate wall 2 which is provided with a plate frame 3 around its periphery. Plate frame 3 has such a thickness that it projects beyond the two surfaces of plate wall 2. Several such membrane plates 1 next to one another, or arranged to alternate with simple filter plates 18 without membranes, or also alternating with simple frames, together constitute the filter plate packet of a filter plate press. Depending on the configuration of the filter press, such membrane plates may also be provided with a membrane on only one side which is a configuration that is employed, in particular, for plate filter presses in which the filter plates are oriented horizontally. A respective filter chamber is formed between membrane plate 1 and each further plate adjacent thereto.

A press membrane 4 fixed in a groove 7 in the transition region 5 between plate frame 3 and plate wall 2 by means of an edge bead 6 rests on each side of plate wall 2. The press membrane 4 made of an elastic material, for example of rubber of an appropriate quality, is provided, on its side facing away from plate wall 2, with a plurality of nub-like projections 8 which support a filter cloth 9 that is placed over them. In the illustrated embodiment, the filter cloth hangs over the upper edge 10 of plate frame 3 and is provided at the respectively associated locations with passage openings corresponding to the channel bores 11 in the plate frame. In the illustrated embodiment, the central region of the filter plate is not shown. Depending on the structure of the plate as a whole, it may have a closed surface or it may be provided with a corresponding passage fitting for a central heavy liquid discharge. However, the configuration of this region is of no significance for an understanding of the structure according to the invention.

As will be discussed in greater detail below with reference to the enlarged sectional view, the edge bead 6 of press membrane 4 is fastened by means of a holding frame 12 which is held at plate frame 3 by way of appropriate connecting means to be movable in a direction perpendicular to the plane of the plate. As evident from the illustration, filter cloth 9 covers plate frame 3 as well as holding frame 12.

Figure 2:
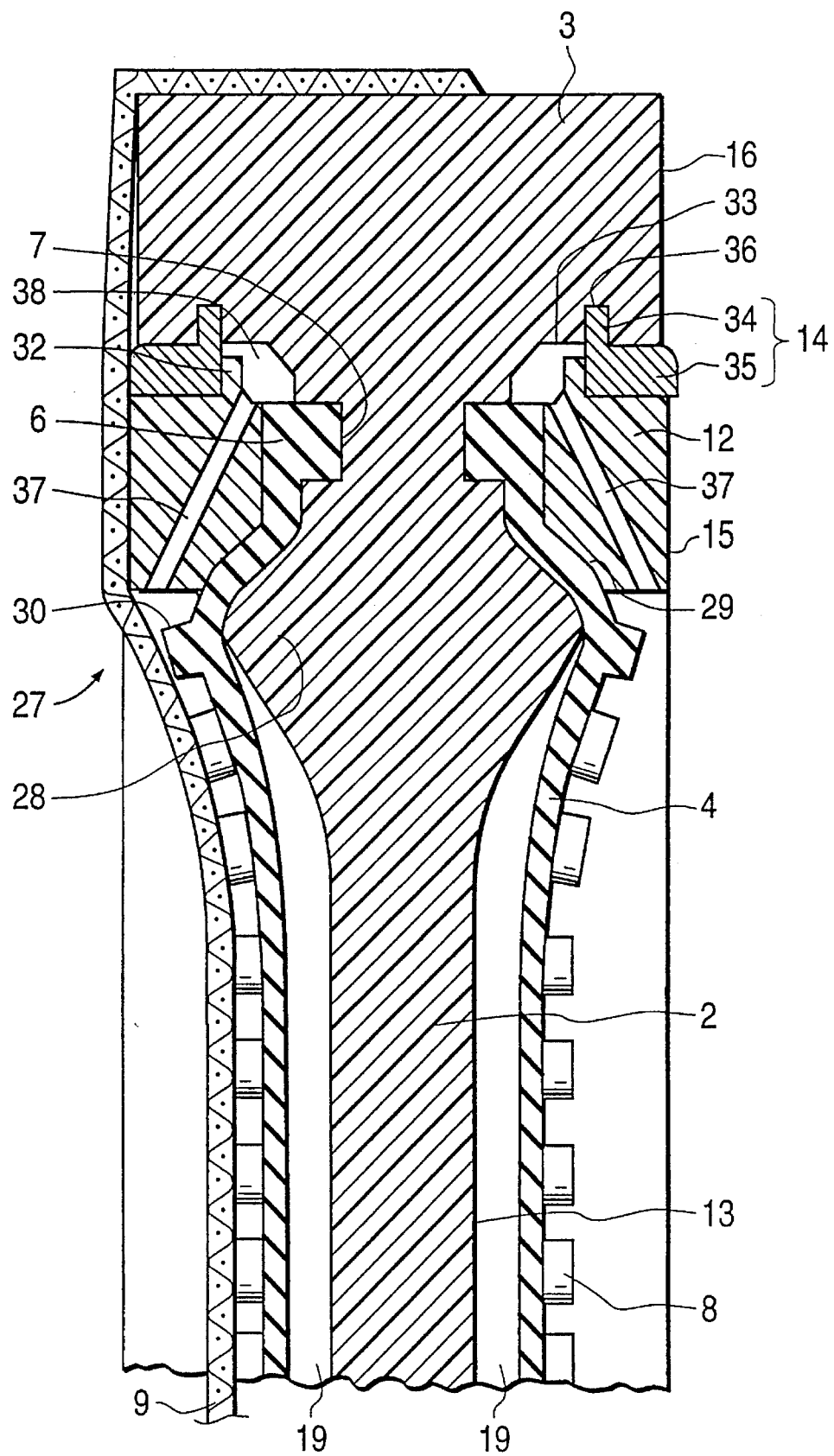
FIG. 2 is a sectional view, to a larger scale, of the membrane plate of FIG. 1 including fastening means for the press membrane.

As indicated in the enlarged sectional view of FIG. 2, the groove 7 accommodates the edge bead 6 of press membrane 4 and lies approximately at the same level as the respective exterior plane 13 of plate wall 2. In the region of edge bead 6, press membrane 4 is covered by holding frame 12 which is fastened over edge bead 6 by way of appropriate fastening means 14 that will be described in greater detail below. Fastening means 14 are configured in such a way that, if the filter chamber is open (i.e., if the associated adjacent plate, such as plate 18, is spaced from membrane plate 1, as shown, for example, in FIG. 1) the fastening means press holding frame 12 onto edge bead 6 while only slightly compressing the edge bead. This operational state is shown in FIG. 2, and corresponds to a first position of holding frame 12, where the lateral surface of the holding frame projects beyond the lateral surface 16 of plate frame 3, which serves as a contact surface between membrane plate 1 and further adjacent plates. The extent to which lateral surface 15 projects beyond lateral surface 16 is here predetermined in such a way that the desired deformation of edge bead 6 is realized when the contact surface 17 of the adjacent plate 18 is pressed onto the corresponding lateral surface 16 of membrane plate 1 so that, with the filter chamber thus being closed, surface 15 and surface 16 lie in a common plane. This operational state corresponds to a second position of holding frame 12. Thus, the pressure chamber 19 disposed between plate wall 2 and membrane 4 is sealed toward the edge, with the sealing force to be derived from the defined deformation of edge bead 6 in conjunction with the given wall thickness of press membrane 4 again determining the highest permissible pressure force for the pressure medium to be introduced into pressure chamber 19.

As soon as the filter chamber is opened, the edge bead is able to practically completely relax except for a slight bias. The material of the edge bead is able to "recover" during the duration of the opening period.

FIG. 2 shows to a larger scale and as a sectional view the connecting means for the connection between plate frame 3 and holding frame 12. In the illustrated embodiment, membrane 4 is made, for example, of a rubber having a Shore hardness 65. The associated holding frame 12 is likewise made of a rubber which, however, has a greater hardness, for example, a Shore hardness of 78. Since both elements are made of rubber, the holding frame can be fixed to the region of the edge bead 6 of membrane 4 by vulcanization. If plastics are employed for holding frame and membrane, both elements can be appropriately welded together.

On its peripheral surface facing plate frame 3, holding frame 12 is now provided with a continuous supporting web 32 whose outer edge extends closely to the peripheral surface 33 of plate frame 3 facing the holding frame. A fastening means 14 in the form of a web-shaped projection 34 made of an elastic material such as a soft rubber or plastic having a shore hardness less than that of the holding frame, now lies against this supporting web 32. In the region of holding frame 12, this projection widens to form a sealing element 35 which fills the gap between the exterior peripheral surface of holding frame 12 and the interior peripheral surface of plate frame 3. The outer edge of the web-shaped projection 34 here lies in a continuous groove 36 in the interior peripheral surface 33 of plate frame 3. After membrane 4 has been inserted, the sealing element 35 of web-shaped projection 34 can now be pressed, together with holding frame 12 fixed to it, into groove 36 from the outside. In embodiments in which the sealing element 35 of the web-shaped projection is fixed to the holding frame, slight deformation of the web-shaped projection 34 of the holding frame in the plane of the plate permits the holding frame to engage inwardly in the groove. The web-shaped projection 34, which serves to fasten plate frame 3 and holding frame 12 is here dimensioned in such a way that edge bead 6, when engaged as shown in FIG. 2, is compressed very slightly. Fastening means 14, together with continuous supporting web 32 and continuous groove 36, constitute a connecting means for connecting the holding frame to the plate frame, and for limiting the transverse movement of the holding frame between its first position and its second position, as described above. The elasticity of web-shaped projection 34 ensures mobility of holding frame 12 so that, if the filter chamber is closed, the lateral surface 15 defined by holding frame 12 can be pressed down so as to be in a common plane with lateral surface 16 defined by the plate frame while simultaneously deforming edge bead 6. This causes edge bead 6, which has a smaller cross section than groove 7, to be shaped into groove 7, producing an extremely effective seal that is able to withstand pressure forces of more than 10 bar for the rear side of the press membrane, that is, the side facing pressure chamber 19.

As is evident from the sectional view, press membrane 4 is provided, adjacent edge bead 6, with a continuous bulge 27 that is oriented toward the filter chamber; a corresponding continuous bulge 28 in plate wall 2 is associated with each bulge 27.

As can be seen in FIG. 2, if pressure chamber 19 is charged with a pressure medium, the press membrane 4 is pushed into the associated filter chamber area. To reduce stretching of the membrane material in the peripheral region of membrane 4, which is already under great strain from the stresses created by the clamping forces, the apical region of bulge 27, on the side facing the associated filter chamber, is provided with a continuous supporting bead 30 that extends parallel to the inner edge of holding frame 12. If, during the pressing process, the press membrane is subjected fully to pressure medium and is pushed far into the associated filter chamber, then, approximately at the moment at which portions of the press membrane in the vicinity of plate 2 are parallel to plate 2, the supporting bead 30 comes into contact with the inner edge of holding frame 12 and thus limits movement of membrane 4 in this region. The further deformation of the press membrane under progressive compression then takes place at an even greater distance from the fastening edge of the press membrane so that, as a whole, critical stresses on the press membrane are avoided in its particularly vulnerable peripheral region.

However, supporting bead 30 need not be continuous. As shown in FIG. 1, bead 30 may be interrupted at regular uniform intervals by grooves 31 that are oriented radially to the plate edge. These grooves 31 are associated with approximately coaxially oriented bores 37 in holding frame 12 which, as shown in the sectional view of FIG. 2, open into a continuous channel-like recess 38 in the peripheral region of membrane 4. Grooves 31 and bores 37 serve to permit extraction of liquid in the peripheral region of the membrane as well and thus serve to ensure that the filter cake is pressed out almost completely, as the recesses 38 are in communication with channel bores 11 by way of corresponding, non-illustrated bores in plate frame 3 in the region of the channel bores.

I claim:

1. In a membrane plate to be assembled with additional plates to form a filter press, the membrane plate comprising a plate member composed of a plate wall having a peripheral region provided with a plate wall groove, and a plate frame surrounding said plate wall at said peripheral region; said plate frame having a plate frame lateral surface extending in a plane substantially parallel to and directed away from a plane of said plate wall, and a plate frame interior peripheral surface facing in a direction of said plate wall and being oriented generally perpendicularly to the plane of said plate frame lateral surface;

a flexible press membrane disposed adjacent at least one side of said plate wall to be acted upon by a pressure medium, said membrane having a continuous peripheral edge bead and being seated in said plate wall groove;

a holding frame covering said edge bead on a side of said edge bead directed away from said plate wall, said holding frame having a holding frame exterior peripheral surface facing toward said plate frame interior peripheral surface; and connecting means for securing said holding frame to said plate frame and for permitting movement of said holding frame in a direction perpendicular to the plane of said plate wall between first and second positions; in said first position said holding frame being closer to said wall plate groove than in said second position;

the improvement wherein said connecting means comprises a continuous peripheral groove in said plate frame interior peripheral surface;

a continuous, elastic member supported on said holding frame exterior peripheral surface; said elastic member comprising a continuous, elastic web projecting from said holding frame exterior peripheral surface and being received by said continuous peripheral groove;

securing means for securing said elastic member to said holding frame and wherein said membrane and said elastic member are formed of an elastomeric material having a shore hardness less than a shore hardness of said holding frame.

2. The membrane plate according to claim 1, wherein said securing means includes a continuous supporting shoulder provided on said holding frame and adjoining said holding frame exterior peripheral surface; said supporting shoulder engaging said elastic member.

3. The membrane plate according to claim 2, wherein said elastic member includes a sealing element extending from said holding frame exterior peripheral surface to said plate frame interior peripheral surface, said sealing element abutting against said supporting shoulder.

4. The membrane plate according to claim 3, further comprising a first channel extending along said plate frame and being bounded by a surface of said edge bead of said press membrane, said plate frame interior peripheral surface and a surface of said holding frame;

a second channel passing through said plate frame and being in communication with said first channel; and a third channel passing through said holding frame and having opposite first and second ends; said first end opening into said first channel and said second end opening into a space adjacent said press membrane.

5. The membrane plate according to claim 1, wherein said holding frame is firmly affixed to said press membrane at a region adjacent said edge bead.

6. The membrane plate according to claim 1, wherein said securing means comprises means for firmly affixing said elastic member to said holding frame.

* * * * *